Patented Jan. 2, 1934

1,942,015

UNITED STATES PATENT OFFICE 1,942,015

PROCESS FOR OBTAINING METALS FROM SILICEOUS ROCKS

Ernst Wydler, Leimbach, Switzerland

No Drawing. Application January 2, 1932, Serial No. 584,585, and in Switzerland October 31, 1931

7 Claims. (Cl. 75—17)

It is known that by calcining rocks such as feldspar, glauconite, leucite, greensand, phonolite etc. in a furnace or under the action of an electric current, and after admixture with nitrates, carbonates, oxides etc., the said rocks decompose and become partly soluble, and that by the action of heat, silicon is obtained.

This process is not efficient; the consumption of fuel is very large, and the preliminary work required to obtain and separate the oxides very tedious.

The object of the present invention is to provide a simple and efficient process, so as to separate silicon from the above-mentioned rocks which contain the silicon in the form of an oxide, and other metallic components such as aluminium, potassium, sodium or iron (which also occur in the form of oxides in these rocks). For this purpose there is employed the combined oxygen of these oxides, together with chemical substances as fuel. An autothermic reaction is thereby obtained, which thanks to the oxygen present, proceeds at a temperature of 2500-3000° C. At this temperature, there occurs a complete separation of the silicon. The silicon, which is obtained in this manner, forms for the most part a block with crystalline fracture. After comminution it dissolves readily in hydrofluoric and nitric acids. By the addition of calculated amounts of suitable material, there can be obtained silicon alloys if it is not desired to obtain silicon in pure form.

The components which render possible the autothermic process must be chosen that (1) All the oxygen is consumed (2) That the metals occurring are separated (3) That the metals such as aluminium and potassium do not separate out as pure metals, but give chemical compounds, and then on account of the difference in their solubility can be separated from one another.

Example 1

300 parts by weight of rock, which is very finely ground, and contains 20-25% $Al_2O_3$, 15-20% $K_2O$, 50-55% $SiO_2$ are mixed with 200 parts by weight of aluminium and 240 parts by weight of sulphur, and deflagrated. The combustion proceeds very strongly and is ended after 3 hours.

There is formed potassium sulphide, $Al_2O_3$ and metallic silicon. The gases, which consist of $SO_2$ are collected and further used.

In order to obtain the $Al_2O_3$ chemically pure, the corresponding mineral containing $Al_2O_3$ and $SiO_2$ must be treated with potassium, therewith also the last trace of $SiO_2$ is reduced. The silicon is separated as a solid block from the powdery mass and the same further worked up. There is obtained in this way a complete 100% yield and the products obtained can further be worked up.

Example 2

300 parts by weight of rock, which has been very finely ground, and consists of 20-25% $Al_2O_3$, 15-20% $K_2O$ or $Na_2O$, 50-55% $SiO_2$ and 5-7% $Fe_2O_3$ is mixed with 150 parts by weight of aluminium, 260 parts by weight of sulphur and 26 parts by weight of sodium nitrate. This mixture is deflagrated e. g. by an ignition candle. The mass burns for about 2 hours, according to the volume. The metallic product in this case is ferro-silicon. The powdery mass above consists of sodium sulphide and $Al_2O_3$ the former is soluble in water, the latter not. Both products find further application as intermediate products. They occur at the end of the process in powder form as the porous part. Since they are partly soluble, and partly insoluble in water, they may easily be separated. There is obtained in this way metallic silicon, aluminium oxide, and sodium or potassium salts. The solid metallic silicon can be lifted out as a block of crystalline fracture.

The heat evolved can be either diminished or increased by choice of the additions, and so by suitable choice of these addenda, a violent or slow combustion can be obtained.

The described process for splitting up rocks, with the object of isolating metals therefrom, which are contained as oxides or silicates in the rocks cited can for example be applied to the following starting materials.

Nontronite group:—With the object of isolating nickel, besides magnesium and silicon.

Serpentine group:—In order to obtain magnesium in metallically pure form, also metallic silicon.

Chlorite group:—In order to obtain pure metallic magnesium from an amestite silicate, besides metallic silicon and alumina.

Mica group:—In order to obtain soluble potassium salts, besides pure metallic silicon.

Clay group:—To obtain pure metallic silicon besides alumina.

Zeolite group:—Analium gives besides pure metallic silicon, alumina and water soluble sodium.

Further examples of the application of the new process are:—

Espistilbite gives pure metallic calcium, besides silica and alumina.

Gmelinite gives besides pure metallic silicon, alumina and water soluble $Na_2S$.

Albite gives the same results, only with sodium in place of potassium.

Andalusite group gives silicon, alumina. This mineral is very suitable for obtaining the corresponding alloys of silicon.

Garnet group may be used for the isolation of beryllium. Metallic silicon and alumina, and beryllium sulphide which can be further worked up, are obtained.

Olivine group are suitable for the preparation of metallic beryllium if e. g. phenocite is used, pure metallic beryllium silica and alumina are produced.

Willemite gives pure metallic tin, alumina and silica which may be further worked up.

Pyroxene-amphibole group are mainly used for this decomposition on account of the metallic magnesium.

Wernerite group sarkolite can be used in the preparation of pure metallic calcium, also melilite.

According to the addition of chemical products to the mixture of the combustible metal, the corresponding metals are obtained in the pure metallic condition.

In the appended claims by metals is to be understood metals proper, or metallic silicon or alloys.

Further examples of the application of the new process are:—

If there are taken minerals which contain no silicates also no aluminium, for example chrome iron ore or ilmenite which consist of metal oxides, then either the pure metal or the separate oxides can be obtained.

*Example.*—300 parts of ilmenite, 200 parts of sulphur, 200 parts of aluminium are mixed and set alight by means of a fuse.

There is obtained titanium in the pure form, which may be further worked up from the oxides.

The iron can easily be separated as iron sulphide and worked up for other purposes.

Other examples of this process are when sulphates, chlorates and other salts, in this manner are converted back into their metals.

*Example.*—300 parts of chromium sulphate, 200 parts of sulphur and 200 parts of aluminium are deflagrated by means of a fuse, and the sulphur dioxide is led off from the reaction and further used. Pure chromium is obtained as metal.

Additions of bauxite, corundum, pyrolusite and ayolite are used as addenda, in order to lower the melting point of the melt. These addenda are mainly used when gypsum is treated.

What I wish to claim and secure by U. S. Letters Patent, is:

1. A process of treating a mineral of the double silicate type which contains an oxide of an alkali metal, or an alkali earth metal, and iron and also one or more elements to be recovered in elemental form, including silicon with nickel or beryllium, which comprises mixing said mineral with finely divided aluminum and sulphur containing at least as much sulphur as aluminum and not more than 30% excess of sulphur to aluminum, the sulphur being utilized in sufficient proportion to convert the alkali metal oxide and the alkali earth metal oxide present into sulphides and the aluminum being present in sufficient proportion to remove all oxygen from the other oxides present in the minerals, igniting the mixture, and dissolving the soluble sulphides away from the insoluble, oxides and elements so produced.

2. A process of treating a mineral of the type which contains one or more oxides of alkali metals, and alkali earth metals, and iron and also one or more elements to be recovered in elemental form, of the group consisting of silicon, nickel, magnesium, beryllium, chromium and titanium, which comprises combining about 300 parts by weight of the ground mineral with between 150 to 200 parts by weight of divided aluminum and with between 200 to 260 parts by weight of divided sulphur, igniting the mixture and separating the silicon and metals formed from the sulphides and oxides by treatment with water.

3. A process of treating a mineral of the type which contains one or more oxides of alkali metals, and alkali earth metals, and iron and also one or more elements to be recovered in elemental form, of the group consisting of silicon, nickel, magnesium, beryllium, chromium and titanium, which comprises mixing together 300 parts of the mineral with 200 parts of aluminum, with 200 to 260 parts of sulphur and with a small quantity of sodium nitrate equal to from 5% to 10% of the sulphur by weight, igniting the mixture and then separating the soluble products by treatment with water.

4. A process of treating a mineral of the type which contains one or more oxides of alkali metals, and alkali earth metals, and iron and also one or more elements to be recovered in elemental form, of the group consisting of silicon, nickel, magnesium, beryllium, chromium and titanium, which comprises mixing the finely divided mineral with finely divided aluminum and finely divided sulphur, the sulphur and aluminum being present in approximately equal quantities and each being present in smaller quantity than the mineral, igniting the mixture, and separating the soluble from the insoluble reaction product by treatment with water.

5. A process of treating a mineral of the type which contains one or more oxides of alkali metals, and alkali earth metals, and iron and also one or more elements to be recovered in elemental form, of the group consisting of silicon, nickel, magnesium, beryllium, chromium and titanium, which comprises combining the divided mineral with relatively large quantities of divided aluminum and sulphur and with relatively small quantities of divided alkali metal nitrate, igniting the mixture, and separating the soluble from the insoluble product by treatment with water.

6. A process of treating a mineral containing 20 to 25% of alumina, 15 to 20% of an alkali metal oxide and 50 to 55% of silica to produce elemental silicon, alkali sulphide and aluminum oxide, which comprises mixing 300 parts of the divided mineral with 200 parts by weight of divided aluminum and 240 parts by weight of divided sulphur, igniting the mass, permitting the ignition to continue for three hours, and then separating the alkali sulphide from the aluminum oxide and metallic silicon by treatment with water.

7. A process of treating a mineral containing 20 to 25% of alumina, 15 to 20% of alkali metal oxide, 50 to 55% of silica and 5 to 7% of iron oxide, which comprises mixing 300 parts of the divided mineral with about 150 parts of divided aluminum, about 260 parts of divided sulphur and about 26 parts of divided sodium nitrate, igniting and permitting the mass to burn for about 2 hours and removing the sodium sulphide from the ferro-silicon and the aluminum oxide by treatment with water.

ERNST WYDLER.